United States Patent [19]
Ehret

[11] 3,863,146

[45] Jan. 28, 1975

[54] MEASURING INSTRUMENT FOR THE ELECTRICAL DETERMINATION OF DAMAGE TO AN ENAMEL LAYER

[75] Inventor: Rudolph Ehret, Schwetzingen, Germany

[73] Assignee: Pfaudler-Werke AG, Schwetzingen, Germany

[22] Filed: Nov. 28, 1973

[21] Appl. No.: 418,460

[30] Foreign Application Priority Data
Dec. 5, 1972   Germany............................ 2259492

[52] U.S. Cl..................................... 324/54, 324/29
[51] Int. Cl....................... G01r 31/12, G01n 27/20
[58] Field of Search............................ 324/29, 30, 54

[56] References Cited
UNITED STATES PATENTS
3,210,655   10/1965   McGlasson et al. .................. 324/54
3,551,801   12/1970   Wood et al. .......................... 324/29
3,555,414   1/1971   Deichelmann ........................ 324/54

OTHER PUBLICATIONS
Voellmin, Siegfried; Method for Continuous Monitoring...of Containers, Verfahrenstechnik Vol. 6, No. 11, pp. 393-395, 1972.

*Primary Examiner*—Gerard R. Strecker
*Attorney, Agent, or Firm*—Theodore B. Roessel; James A. Rich

[57] ABSTRACT

Faults in vitreous enamel linings on steel walled vessels such as chemical reactors or piping containing an electrolyte are indicated by an electrical system including a glass or platinum electrode in contact with the electrolyte and connected to the vessel wall through a voltmeter. An auxiliary platinum electrode also contacts the electrolyte and is connected to the voltmeter in parallel with the vessel wall. The auxiliary electrode reduces the effect of background or interference voltage and thereby improves the sensitivity of the system.

3 Claims, 3 Drawing Figures

PATENTED JAN 28 1975　　　　　　　　　　　　　　　　　　　3,863,146

3,863,146

MEASURING INSTRUMENT FOR THE ELECTRICAL DETERMINATION OF DAMAGE TO AN ENAMEL LAYER

BACKGROUND OF THE INVENTION

This invention relates to an electrical system for indicating faults in vitreous enamel linings on steel walled vessels such as chemical reactors or piping which are used to process, store or transport electrolytic liquids.

One method of determining faults in vessels of this type is to insert a suitable electrode into the electrolyte and connect it through a voltmeter to the steel vessel wall. When a fault in the enamel lining occurs and the electrolyte contacts the steel wall, the potential difference between the electrode and the wall increases and the increased reading on the voltmeter indicates that a fault has developed in the lining. Systems operating on this principal are disclosed in German Pat. Application No. P 21, 54, 127.5 and in an article by Siegfried Voellmin, entitled "Methods for Continuous Monitoring of the Enamel Layers of Containers," appearing in Verfahrenstechnik, Vol. 6, No. 11, pp. 393–395 (1972).

One problem with systems of this type is that background or interference voltages that can affect the sensitivity of the system can be produced under certain circumstances even though the enamel lining remains intact. Interference voltages may appear where tantalum repair plugs, conductive cements used with repair plugs, stainless steel agitators or the like form high resistance connections to the vessel wall. Small liquid leaks at valves and flanges create another source of these interference voltages. These interference voltages are particularly likely to occur where glass or other high resistance electrodes are used because high resistance voltmeters must be used with these electrodes. In the case of damaged enamel, the indicated voltage is determined not by the size of the damaged surface but by the ratio between the resistivity of the electrolyte and the internal resistivity of the voltmeter. Thus, even very small leaks can cause a high resistance voltmeter to indicate that a defect in the enamel lining has occured.

SUMMARY OF THE INVENTION

It is an object of this invention to minimize these background or interference voltages. According to the invention, a system including a glass or platinum electrode connected through a voltmeter to the steel vessel wall is provided with an auxiliary platinum electrode connected to the voltmeter in parallel to the steel wall. This suppresses the interference voltages and thereby improves the sensitivity of the system.

In one embodiment of the invention, the auxiliary platinum electrode is connected to the voltmeter and the steel wall of the vessel through a variable resistance. In this version, not only are the interference voltages reduced substantially but these effects can be controlled by adjusting the variable resistance so that the sensitivity of the instrument is proportional to the prevailing leak resistivity.

Other objects and advantages of this invention will be apparent from the following description.

DRAWINGS

DETAILED DESCRIPTION

Figure 1:
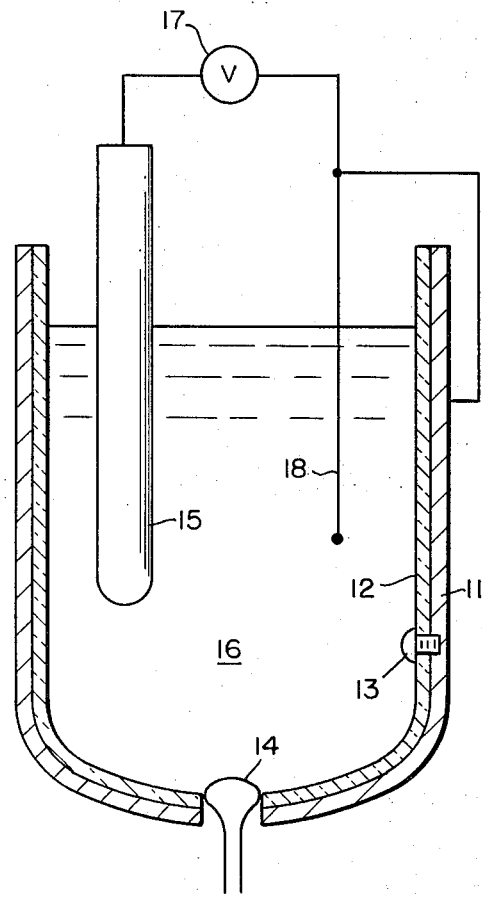
FIG. 1 represents a first design variant of a measuring instrument according to this invention, provided with a glass electrode and an auxiliary platinum electrode.

FIG. 1 illustrates a vessel having a steel wall 11 lined with a layer of vitreous enamel 12. As is customary in vessels of this sort, tantalum plugs 13 may be used to repair defects in the enamel lining 12. A flush valve 14 is provided in the bottom of the vessel.

A glass electrode 15, which may be a steel tube with an exterior layer of vitreous enamel, contacts the electrolytic liquid 16 inside the vessel 10. The electrode is connected through a voltmeter 17 to the steel wall 11 of the vessel. Since glass electrodes have a high resistance, a high resistance voltmeter is generally required.

An auxiliary platinum electrode 18, which also contacts the electrolyte in the vessel, is connected to voltmeter 17 in parallel with the steel wall 11 of the vessel. This auxiliary platinum electrode short circuits high resistance conductive paths from the electrolyte to the steel wall, such as those formed by tantalum repair plugs or by small liquid leaks at the flush valve 14, and thus suppresses interference voltages produced by these elements. As a result, the difference between the background reading on the voltmeter and the reading that occurs when the enamel is damaged and the electrolyte 16 contacts the steel wall 11 of the vessel is increased significantly and the sensitivity of the system is improved.

Figure 2:
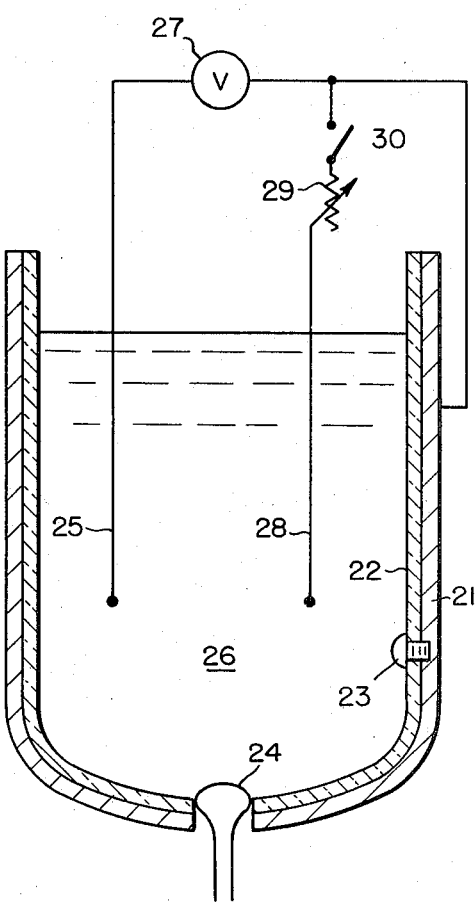
FIG. 2 illustrates a second design variant with two platinum electrodes.

The version shown in FIG. 2 differs from the one in FIG. 1 in that the glass electrode 15 in the system in FIG. 1 is replaced by a platinum electrode 25. This arrangement is preferable as a general rule because the potentials at platinum electrode 25 and the auxiliary platinum electrode 28 cancel each other out if the enamel is not damaged.

The system shown in FIG. 2 also differs from the system shown in FIG. 1 in that the auxiliary platinum electrode 28 is connected to the voltmeter 27 and the steel wall 21 of the vessel through a variable resistance 29 and a switch 30. As was mentioned above, the variable resistance may be used to adjust the sensitivity of the instrument. The switch may be used to remove the auxiliary platinum electrode 28 from the circuit temporarily, which allows interference voltages, such as might be caused by small leaks at the flush valve 24, to be indicated by the voltmeter. Thus, this system may be used to check for leaks at the valve.

Figure 3:
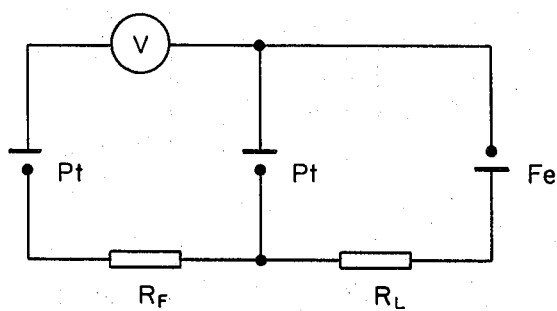
FIG. 3 represents the circuit diagram of the measuring instrument shown in FIG. 2.

FIG. 3 illustrates the electrical equivalent of the system shown in FIG. 2. In this diagram $R_F$ indicates the resistance of the electrolytic fluid in the vessel and $R_L$ indicates the resistance at any leaks that may be present, as for example at the filling valve. Laboratory scale tests using hydrochloric acid indicate that this system will not indicate the presence of iron unless $R_L$ is less than 10 kohms. These laboratory tests also show the dual platinum electrode system will substantially eliminate interference voltages caused by tantalum repair plugs. As the following tests results show, where the enamel layer remains intact and the acid is not able to contact the steel of the vessel wall, the resulting voltage is essentially zero. However, when a defect does occur and the acid contacts the steel vessel wall, this system produces a potential of approximately 0.6 volts.

1z 2N HYDROCHLORIC ACID $Pt - Pt + Ta = 0$ volts $PT - Pt + Ta + Fe = 0.63$ volt 2. 4N hydrochloric acid $Pt - Pt + Ta = 0$ volts $Pt - Pt + Ta + Fe = 0.57$ volts It should be understood that the embodiments of this invention described above are merely illustrative and that many modifications may be made by those skilled in the art. For example, this invention may also be used to monitor enamel lined pipes. A number of other modifications may also be made within the scope of this invention, which is defined by the following claims.

I claim:

1. In an electrical system for determining faults in enamel linings of steel walled vessels containing an electrolyte, comprising a glass or platinum electrode in contact with the electrolyte and connected through a voltmeter to the steel wall of the vessel, the improvement comprising a platinum auxiliary electrode in contact with the electrolyte and electrically connected to the voltmeter in parallel with the steel wall.

2. An electrical system according to claim 1 wherein the auxiliary platinum electrode is connected to the voltmeter and the steel wall through a variable resistance.

3. An electrical system according to claim 1 wherein the platinum auxiliary electrode is connected to the voltmeter and the steel wall through a switch.

* * * * *